(12) United States Patent
Ichii et al.

(10) Patent No.: US 7,218,432 B2
(45) Date of Patent: May 15, 2007

(54) OPTICAL SCANNING APPARATUS AND IMAGE FORMING APPARATUS

(75) Inventors: Daisuke Ichii, Tokyo (JP); Yoshinori Hayashi, Kanagawa (JP)

(73) Assignee: Ricoh Company, Limited., Tokyo (JP)

( * ) Notice: Subject to any disclaimer, the term of this patent is extended or adjusted under 35 U.S.C. 154(b) by 0 days.

(21) Appl. No.: 11/423,017

(22) Filed: Jun. 8, 2006

(65) Prior Publication Data

US 2006/0285187 A1 Dec. 21, 2006

(30) Foreign Application Priority Data

Jun. 20, 2005 (JP) .............................. 2005-178936

(51) Int. Cl.
*G02B 26/08* (2006.01)
*B41J 15/14* (2006.01)

(52) U.S. Cl. .................... 359/204; 359/212; 359/216; 347/232; 347/243

(58) Field of Classification Search ..................... None
See application file for complete search history.

(56) References Cited

U.S. PATENT DOCUMENTS

| | | | | |
|---|---|---|---|---|
| 5,727,014 A | * | 3/1998 | Wang et al. | ................... 372/96 |
| 6,002,705 A | * | 12/1999 | Thornton | ..................... 372/96 |
| 6,185,026 B1 | | 2/2001 | Hayashi et al. | |
| 6,198,562 B1 | | 3/2001 | Hayashi et al. | |
| 6,317,246 B1 | | 11/2001 | Hayashi et al. | |
| 6,803,941 B2 | | 10/2004 | Hayashi et al. | |
| 6,956,685 B2 | | 10/2005 | Hayashi | |
| 6,987,593 B2 | | 1/2006 | Hayashi et al. | |
| 2003/0086142 A1 | * | 5/2003 | Akatsu et al. | .............. 359/204 |
| 2004/0001241 A1 | | 1/2004 | Hayashi et al. | |
| 2004/0090520 A1 | | 5/2004 | Sakai et al. | |
| 2004/0246330 A1 | | 12/2004 | Hayashi et al. | |
| 2005/0046916 A1 | * | 3/2005 | Shimomura | .................. 359/205 |
| 2006/0077500 A1 | | 4/2006 | Hayashi et al. | |

FOREIGN PATENT DOCUMENTS

| | | |
|---|---|---|
| JP | 10-304044 | 11/1998 |
| JP | 3227226 | 8/2001 |

* cited by examiner

*Primary Examiner*—James Phan
(74) *Attorney, Agent, or Firm*—Oblon, Spivak, McClelland, Maier & Neustadt, P.C.

(57) ABSTRACT

A light source which is a surface emitting laser including a plurality of apertures that correspond to light emitting regions arranged in a two-dimensional array and limit the regions, and a scanning optical system satisfies conditions of Dm·|βm|<ωm and Ds·|βs|<ωs, where Dm is a width of each of the apertures in a main scanning direction, Ds is a width of the each aperture in a sub-scanning direction, βm is a magnification of both of a coupling optical system and the scanning optical system in the main scanning direction, βs is a magnification of both of the coupling optical system and the scanning optical system in the sub-scanning direction, ωm is a size of an optical spot in the main scanning direction formed on a scan target surface, and ωs is the size of the optical spot in the sub-scanning direction formed on the scan target surface.

8 Claims, 5 Drawing Sheets

OPTICAL SCANNING APPARATUS AND IMAGE FORMING APPARATUS

CROSS-REFERENCE TO RELATED APPLICATIONS

The present document incorporates by reference the entire contents of Japanese priority document, 2005-178936 filed in Japan on Jun. 20, 2005.

BACKGROUND OF THE INVENTION

1. Field of the Invention

The present invention relates to an optical scanning apparatus and an image forming apparatus using a light source having a plurality of light emitting points. The present invention can be applied to an image forming apparatus such as a printer, a copying machine, a facsimile machine or a multifunction product thereof.

2. Description of the Related Art

In recent years, demand for accelerating an image forming rate and improving a resolution of an image forming apparatus has been escalating, and an increased scan rate is desired. To meet this demand, an image forming apparatus using a multibeam write optical scanning apparatus that scans one scan target surface relative to a plurality of beams is put to practical use. The optical scanning apparatus or particularly a laser scanning apparatus using a semiconductor laser is simple in structure, and high in scan rate and resolution. Due to this, the apparatus has been widely used in an image forming apparatus such as an image display apparatus or an image recording apparatus. The laser scanning apparatus is optimum as an exposure apparatus of an electrophotographic printer, and many products are circulated in the market, as laser printers.

The demand for accelerating the image forming rate and improving the resolution of the image forming apparatus has been further escalating and the increased scan rate is further desired. To realize a high optical scan rate, it is necessary to provide a high speed deflector. However, if the deflector is, for example, a rotating polygon mirror, there is an upper limit to the rotation speed of the mirror because of problems of noise, heat and the like. To solve these problems, there is provided an optical scanning apparatus using a vertical cavity surface emitting laser (hereinafter, "VCSEL") including a plurality of light emitting regions (light emitting points or light emitting elements) that can be modulated independently of one another. This apparatus is applied to an image forming apparatus using a so-called multibeam scanning apparatus that emits a plurality of light fluxes from the VCSEL and that simultaneously scans a plurality of scanning lines by one scanning (Japanese Patent No. 3227226).

Figure 1:
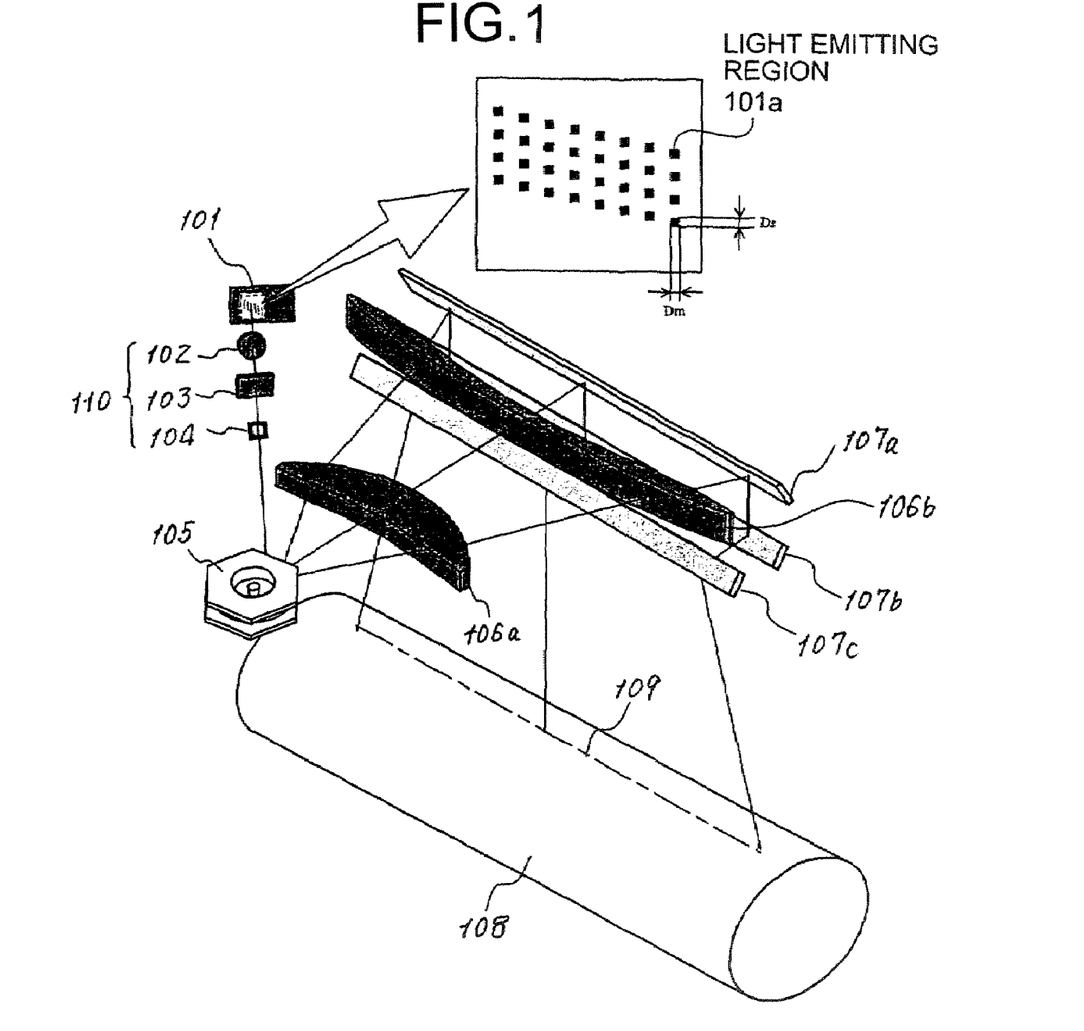
FIG. 1 is a perspective view of an optical scanning apparatus according to a first embodiment of the present invention, depicting an optical arrangement of the optical scanning apparatus.

FIG. 1 is a perspective view of an optical scanning apparatus according to a first embodiment of the present invention. The outline of the optical scanning apparatus using the VCSEL that includes a plurality of light emitting regions will be explained with reference to FIG. 1. In FIG. 1, a light source 101 includes a plurality of light emitting regions 101a, and a light emitting control unit that controls operations of these light emitting regions. A coupling optical system 110 that includes a coupling lens 102, a cylindrical lens 103, and an aperture 104 is arranged on an optical path of a plurality of laser beams emitted from the light source 101. The laser beams emitted from the light source 101 are coupled to a subsequent optical system (an imaging optical system or a scanning optical system) by the coupling lens optical system 110 while cross-sectionally shaping the coupled laser beams by the aperture 104. The coupled laser beams are deflected and reflected by a deflector 105 constituted by a rotating polygon mirror. The coupled laser beams thus deflected and reflected are imaged on a scan target surface 108, which is an image surface, by a first scanning lens 106a and a second scanning lens 106b that constitute the scanning optical system. The scan target surface 108 is a surface of a cylindrical image carrier that supports a photoconductive medium. While the leaser beams are imaged on the scan target surface 108, a scanning line 109 is drawn by the deflection and reflection of the laser beams. A direction of the scanning line 109 corresponds to a main scanning direction. The image carrier is driven to rotate about its central axis, thereby moving the image surface in a direction at a right angle with respect to the main scanning direction. This moving direction corresponds to a sub-scanning direction. By thus performing optical scanning using the laser beams, an image is formed. In the example shown in FIG. 1, a first, a second, and a third mirrors 107a, 107b, and 107c that guide the deflected light fluxes to the scan target surface 108 are arranged.

If the VCSEL is used as the light source of a plurality of laser beams, an irregularity occurs among divergence angles of the beams. If the irregularity occurs, then sizes of optical spots formed on the scan target surface 108 by the respective beams differ, and dots that form the image have irregular sizes, resulting in a deterioration in graininess. Furthermore, for a color image forming apparatus that forms a color image by registering a plurality of toner images different in color, a misregistration occurs among dots in respective colors, thereby causing image quality degradations including a deterioration in color reproducibility. Japanese Patent No. 3227226 discloses a positional relationship between a scanning line and an image spot in the VCSEL, and the invention disclosed therein enables high speed scanning.

Furthermore, there is proposed a technique for setting a distance between the adjacent light emitting regions (light emitting points) of the VCSEL, reducing a thermal crosstalk, and realizing high density recording (see, for example, Japanese Patent Application Laid-open (JP-A) No. H10-301044). However, the conventional techniques including those disclosed in Japanese Patent No. 3227226 and JP-A No. H10-301044 do not solve the image quality degradations resulting from the characteristic irregularities among the respective light emitting regions of the VCSEL.

The VCSEL has the light emitting elements (light emitting regions) monolithically formed on the same substrate. Due to this, the irregularity occurs among distances between the adjacent light emitting regions, resulting from a technical problem in manufacturing the VCSEL. However, there is no avoiding allowing the irregularity within a certain range so as to improve manufacturing yield. If such an irregularity occurs, the VCSEL is unable to select and combine the laser beams having a coincident divergence angle, differently from the conventional semiconductor laser (LD). As a result, it is necessary to reduce the irregularity in beam spot diameter resulting from the irregularity among the divergence angles of the beams emitted from the light emitting elements (light emitting regions) included in one light source. It is also necessary to reduce an irregularity in light utilization efficiency.

SUMMARY OF THE INVENTION

The present invention has been proposed to cope with the aforementioned problems, and it is an object of the present invention to at least partially solve the problems in the conventional technology.

According to one aspect of the present invention, an optical scanning apparatus includes: a light source that emits a plurality of light fluxes; a coupling optical system that couples the light fluxes to an optical system subsequent to the coupling optical system; an optical deflector that deflects the light fluxes in a main scanning direction; and a scanning optical system that is the optical system subsequent to the coupling optical system and images the light fluxes deflected by the optical deflector on a scan target surface, wherein the light source is a surface emitting laser provided with a plurality of apertures that limit a plurality of light emitting regions arranged in a two-dimensional array, the apertures are arranged to correspond to the respective light emitting regions by a one-on-one correspondence, and the scanning optical system satisfies conditions of $Dm \cdot |\beta m| < \omega m$ and $Ds \cdot |\beta s| < \omega s$, where Dm denotes a width of each of the apertures in the main scanning direction, Ds denotes a width of the each aperture in the sub-scanning direction, $\beta m$ denotes a magnification of both the coupling optical system and the scanning optical system in the main scanning direction, $\beta s$ denotes a magnification of both the coupling optical system and the scanning optical system in the sub-scanning direction, $\omega m$ denotes the size of an optical spot in the main scanning direction formed on the scan target surface, and $\omega s$ denotes the size of the optical spot in the sub-scanning direction formed on the scan target surface.

According to another aspect of the present invention, an image forming apparatus includes a plurality of units that execute electrophotographic processes, and further includes an optical scanning apparatus as a unit that executes an exposure process included in the electrophotographic processes, wherein the optical scanning apparatus is constructed as mentioned above.

According to still another aspect of the present invention, a tandem color image forming apparatus is constructed such that it includes a plurality of image forming apparatuses each including units that execute electrophotographic processes, respectively, wherein each of the image forming apparatuses forms images corresponding to a plurality of colors, and that forms a color image by registering the images formed by the respective image forming apparatuses, and wherein each of the image forming apparatuses is provided with an optical scanning apparatus as a unit that executes an exposure process included in the electrophotographic processes, which has a constructed as mentioned above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical scanning apparatus and an image forming apparatus according to the present invention will be explained below with reference to the accompanying drawings.

FIG. 1 is a schematic perspective view of an optical scanning apparatus according to the present invention, depicting an example of an optical arrangement of the optical scanning apparatus. Since the optical arrangement shown in FIG. 1 is already explained, it will not be explained herein.

Figures 2A, 2B:
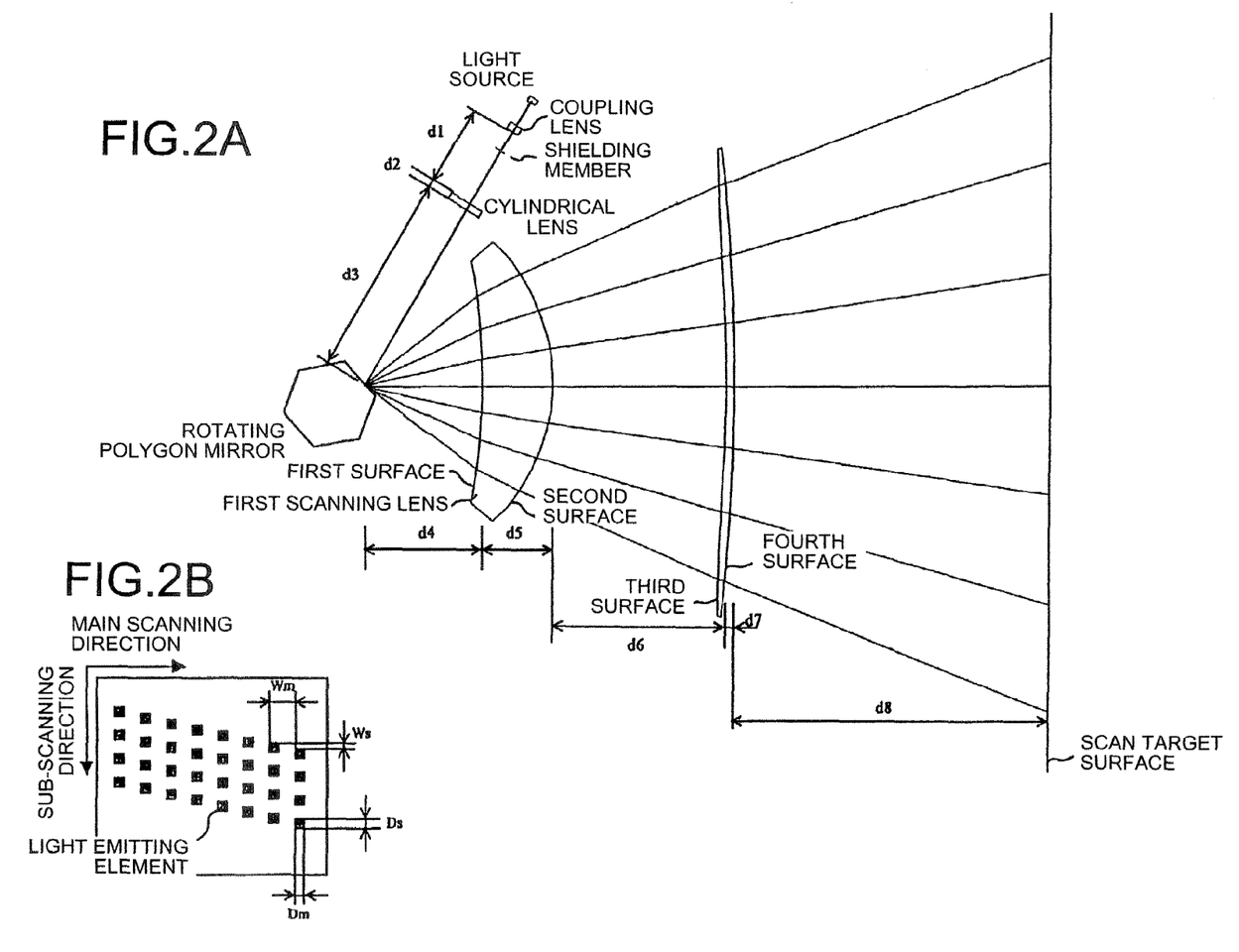
FIG. 2A is a cross-sectional plan view of the optical scanning apparatus in a main scanning direction according to the first embodiment.
FIG. 2B is a front view of a light source according to the first embodiment.

In the first embodiment, respective optical components are constituted as follows in the example of the optical arrangement shown in FIG. 1. A cross section of the optical scanning apparatus according to the first embodiment in the main scanning direction is shown in FIG. 2A.

(1) Light Source 101

A surface emitting laser (VCSEL) array; A central wavelength: 780 nanometers; the number of channels: 32; a distance Wm between the adjacent light emitting elements (light emitting regions) in the main scanning direction: 42.3 micrometers; a distance Ws between the adjacent light emitting elements (light emitting regions) in the sub-scanning direction: 10.6 micrometers; A width Dm of an opening of each light emitting element in the main scanning direction: 4 micrometers; and A width Ds thereof in the sub-scanning direction: 4 micrometers. FIG. 2B depicts arrangement of the light emitting elements of the light source 101.

The light source 101 has a light amount detection monitor PD provided integrally on a VCSEL drive substrate and arranged so as to be able to be adjusted to be rotated about an optical axis of the VCSEL.

A beam divergence angle is 9 degrees both in the main scanning direction and the sub-scanning direction.

(2) Coupling Optical System 110

The coupling lens 102: a focal length: 27 millimeters; and a coupling action: converting a light into a parallel light.

The cylindrical lens 103: a power only in the sub-scanning direction; and a focal length: 126 millimeters.

(3) Rotating Polygon Mirror (Optical Deflector) 105

A shape of the mirror 105: a hexahedron; and an inradius: 18 millimeters.

(4) Scanning Optical System

The scanning optical system is constituted by the first scanning lens 106a and the second scanning lens 106b. Lens surfaces of the first scanning lens 106a and the second scanning lens 106b are referred to as a first surface, a second surface, a third surface and a fourth surface from a side of the optical deflector 105 to toward the scan target surface.

First Surface: Rotational Symmetric Surface
Rm=−312.597
K=2.66713
A04=1.78574E-07
A06=−1.08065E-12
A08=−3.18123E-14
A10=3.74031E-18
Second Surface: Rotational Symmetric Surface
Rm=−82.951
K=0.01983
A04=2.50305E-07
A06=9.60583E-12
A08=4.54468E-15
A10=−3.03430E-18
Third Surface: Special Toroidal Surface
Rm=−500, Rs=−47.68
K=−71.73194
A04=4.32558E-08
A06=−5.97293E-13
A08=−1.28192E-16
A10=5.72965E-21
J02=1.60296E-03
J04=−2.32231E-07
J06=1.59907E-11
J08=−5.60965E-16
J10=2.17594E-20
J12=−1.24979E-24
Fourth Surface: Toroidal Surface
Rm=−1000, Rs=−23.38

A surface shape of the first scanning lens 106a and the second scanning lens 106b satisfies the following equations (1).

$$x = \frac{CH^2}{1 + \sqrt{1 - (1+K)C^2H^2}} + A_2H^2 + A_3H^3 + \ldots + A_{18}H^{18}$$

$$C = \frac{1}{r}$$

$$H = \sqrt{y^2 + z^2}$$

$$R_S(Y) = R_{S0} + j_{01} \cdot Y + j_{02} \cdot Y^2 + j_{03} \cdot Y^3 + \ldots + j_{18} \cdot Y^{18}$$

Equations (1)

In the equations (1), x denotes a depth of the surface shape in the main scanning direction, and y and z denote coordinates in the main scanning direction and the sub-scanning direction, respectively, with the optical axis of the scanning optical system assumed as an origin. In addition, A denotes an aspheric coefficient, r denotes a curvature in the main scanning direction, Rm and K denote conic constants, Rs0=Rs, and J denotes a coefficient of each degree of the shape of the special toroidal surface in the sub-scanning direction.

Air distances or thicknesses of the optical elements from an emission surface of the coupling lens 102 to the scan target surface 108 are assumed as d1, d2, . . . , and d8 (millimeters). The d1, d2, . . . , and d8 are as follows: d1=37.7, d2=3.0, d3=92.5, d4=52.6, d5=31.4, d6=78.0, d7=3.5, and d8=141.5. For reference, d4 denotes the air distance from a deflecting and reflecting surface of the optical deflector 105 to an incident surface of the first scanning lens 106a, and d6 denotes the air distance between the first and the second scanning lenses 106a and 106b. In addition, d7 denotes the thickness of the second scanning lens 106b, and d8 denotes the distance between the second scanning lens 106b and the scan target surface 108.

Dm=4 micrometers; Ds=4 micrometers; |βm|=8.2, |βs|=5.2, Dm·|βm|=32.8 micrometers, and Ds·|βs|=20.8 micrometers.

Figure 3A:
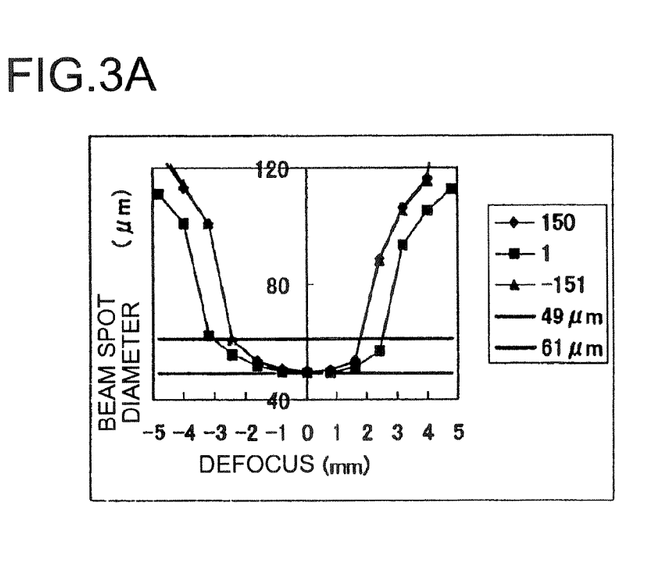
FIGS. 3A and 3B are graphs of depth curves of a beam spot diameter near an image surface in the main scanning direction and a sub-scanning direction according to the first embodiment, respectively.
Figure 3B:
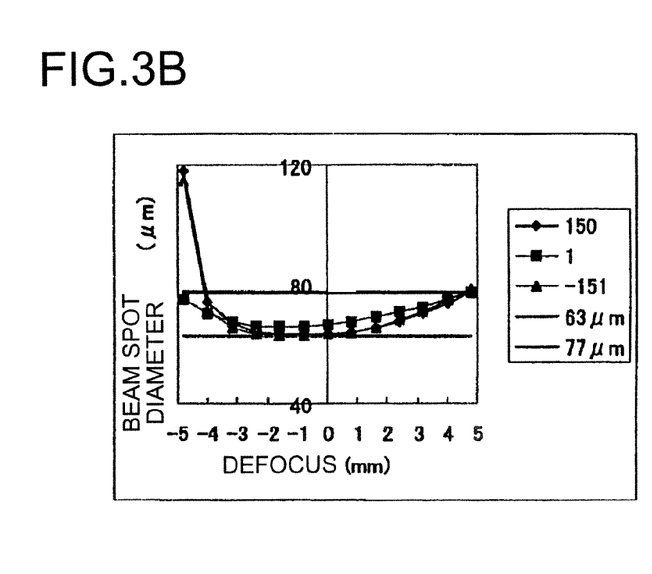

FIGS. 3A and 3B are graphs of depth curves of a beam spot diameter near the scan target surface (image surface) in the main scanning direction and the sub-scanning direction in the scanning optical system, respectively. As evident from FIGS. 3A and 3B, at a defocus of zero (=near the scan target surface 108), a beam spot diameter ωm in the main scanning direction is about 55±6 micrometers and a beam spot diameter ωs in the sub-scanning direction is about 70±7 micrometers. In a central portion of the scan target surface 108 (curves indicated by "1" in legends of FIGS. 3A and 3B) and a peripheral surface thereof (curves indicated by "150" and "−151" in legends of FIGS. 3A and 3B), the beam spot diameters ωm and ωs are stably equal, respectively. Namely, the scanning optical system simultaneously satisfies the following conditions (1).

$$Dm \cdot |\beta m| < \omega m \text{ and } Ds \cdot |\beta s| < \omega s \tag{1}$$

In the conditions (1), Dm denotes the width of the opening of each light emitting element in the main scanning direction, and Ds denotes the width thereof in the sub-scanning direction. In addition, |βm| denotes an absolute value of a magnification of all optical systems in the main scanning direction, and |βs| denotes an absolute value of a magnification thereof in the sub-scanning direction. Furthermore, ωm denotes a size of the optical spot in the main scanning direction formed on the scan target surface 108, and ωs denotes a size of the optical spot in the sub-scanning direction formed thereon. By allowing the optical system to satisfy the conditions (1), even if the irregularity among the divergence angles of beams occurs, it is possible to maintain the beam spot size substantially constant and perform satisfactory optical scanning.

As a comparison to the first embodiment, a first comparison 1 will be explained.

First Comparison (1) Light Source

A surface emitting laser (VCSEL) array; A central wavelength: 780 nanometers; the number of channels: 32; a distance Wm between the adjacent light emitting elements (light emitting regions) in the main scanning direction: 42.3 micrometers; a distance Ws between the adjacent light emitting elements (light emitting regions) in the sub-scanning direction: 10.6 micrometers; A width Dm of an opening of each light emitting element in the main scanning direction: 4 micrometers; and A width Ds thereof in the sub-scanning direction: 4 micrometers. Arrangement of the light emitting elements of the light source is shown in FIG. 2B, similarly to the first embodiment.

The light source has a light amount detection monitor PD provided integrally on a VCSEL drive substrate and arranged so as to be able to be adjusted to be rotated about an optical axis of the VCSEL.

A beam divergence angle is 9 degrees both in the main scanning direction and the sub-scanning direction.

(2) Coupling Optical System

A coupling lens: a focal length: 10 millimeters; and a coupling action: converting a light into a parallel light.

A cylindrical lens: a power only in the sub-scanning direction; and a focal length: 40 millimeters.

(3) Rotating Polygon Mirror (Optical Deflector)

A shape of the mirror: a hexahedron; and an inradius: 18 millimeters.

(4) Scanning Optical System

First Surface: Rotational Symmetric Surface
Rm=−312.597
K=2.66713
A04=1.78574E-07
A06=−1.08065E-12
A08=−3.18123E-14
A10=3.74031E-18

Second Surface: Rotational Symmetric Surface
Rm=−82.951
K=0.01983
A04=2.50305E-07
A06=9.60583E-12
A08=4.54468E-15
A10=−3.03430E-18

Third Surface: Special Toroidal Surface
Rm=−500, Rs=−47.68
K=−71.73194
A04=4.32558E-08
A06=−5.97293E-13
A08=−1.28192E-16
A10=5.72965E-21
J02=1.60296E-03
J04=−2.32231E-07
J06=1.59907E-11
J08=−5.60965E-16
J10=2.17594E-20
J12=−1.24979E-24

Fourth Surface: Toroidal Surface
Rm=−1000, Rs=−23.38

A surface shape satisfies the equations (1). In the equations (1), x denotes a depth of the surface shape in the main scanning direction, and y and z denote coordinates in the main scanning direction and the sub-scanning direction, respectively, with the optical axis of the scanning optical system assumed as an origin. In addition, A denotes an aspheric coefficient, r denotes a curvature in the main scanning direction, Rm and K denote conic constants, Rs0=Rs, and J denotes a coefficient of each degree of the shape of the special toroidal surface.

Air distances or thicknesses of the optical elements from an emission surface of the coupling lens to the scan target surface are assumed as d1, d2, . . . , and d8 (millimeters). The d1, d2, . . . , and d8 are as follows: d1=37.7, d2=3.0, d3=92.5, d4=52.6, d5=31.4, d6=78.0, d7=3.5, and d8=141.5.

Dm=4 micrometers; Ds=4 micrometers; |βm|=22.1, |βs|=4.5, Dm·|βm|=88.4 micrometers, and Ds·|βs|=18 micrometers.

As can be seen, the magnification of all scanning systems in the main scanning direction is as large as 22. An irregularity occurs among the widths of the openings of the VCSEL light emitting elements due to manufacturing irregularity. If the magnification of all scanning systems is high as shown in the first comparison, the irregularity among the widths of the openings of the VCSEL light emitting elements cause a large irregularity among beam spot diameters on the scan target surface. This results in image quality degradations.

As is obvious from the above, by allowing the scanning optical system to satisfy the conditions (1), if the VCSEL is applied to the scanning optical system, it is possible to suppress the irregularity among the beam spot diameters resulting from either the irregularity among the divergence angles of the beams emitted from the VCSEL or that among the magnitudes of the openings of the VCSEL light emitting elements. In addition, the optical scanning that can obtain a high quality image can be performed.

Alternatively, the optical scanning apparatus may be configured to provide a shielding unit between the coupling lens 102 and the cylindrical lens 103 so as to satisfy the conditions (1). If so, the optical scanning apparatus preferably satisfies the following condition (2).

$$0.4 < (Ds \cdot |\beta s|/\omega s)/(Dm \cdot |\beta m|/\omega m) < 1 \qquad (2)$$

Table 1 shows parameters, values in the condition (2), and light utilization efficiencies according to the first embodiment, a second embodiment different from the first embodiment in parameters, and second and third comparisons of the first and the second embodiments, respectively. As the light utilization efficiencies, each light utilization efficiency is standardized based on that according to the first embodiment, and a ratio of each standardized efficiency to the efficiency according to the first embodiment is displayed in the Table 1.

TABLE 1

|  | First embodiment | Second embodiment | First comparison | Second comparison |
|---|---|---|---|---|
| Coupling lens focal length | 27 | 27 | 27 | 27 |
| Cylindrical lens focal length | 126 | 126 | 42 | 126 |
| \|βm\| | 8.2 | 8.2 | 8.2 | 8.2 |
| \|βs\| | 5.2 | 9 | 1.7 | 20 |
| ωm | 55 | 55 | 55 | 55 |
| ωs | 70 | 70 | 70 | 70 |
| Condition (2) | 0.50 | 0.86 | 0.16 | 1.92 |
| Light utilization efficiency | 1.00 | 1.73 | 0.33 | 3.85 |

As evident from the Table 1, in the second embodiment for which the value in the condition (2) is 0.86, the light utilization efficiency is improved and a light amount is satisfactory enough to perform an exposure process. In the second comparison, the value in the condition (2) is 0.16, which is too small. If so, the light utilization efficiency is deteriorated and a problem occurs that the exposure process with a sufficient light amount cannot be performed. In the third comparison for which the value in the condition (2) is as large as 1.92, a light amount is satisfactory enough to perform the exposure process. However, the absolute value |βs| of the magnification of all optical systems in the sub-scanning direction is as large as 20. Due to this, if the VCSEL is used as the light source and an error of a decentration around the optical axis occurs, a distance between adjacent scanning lines in the sub-scanning direction is increased by as much as the magnification. This is because a spatial displacement of each light emitting element at a position in the sub-scanning direction is enlarged by as much as the magnification |βs| in the sub-scanning direction on the scan target surface.

For these reasons, $(Ds \cdot |\beta s|/\omega s)/(Dm \cdot |\beta m|/\omega m)$ is set larger than 0.4 and smaller than 1 as shown in the condition (2). By so setting, even if the scanning optical system is combined with the VCSEL, it is possible to solve the problem of the deficient amount of light and reduce the change of the distance between the adjacent scanning lines resulting from the decentration of the light source. In addition, in the VCSEL used as the light source, polarized lights of the beams emitted from the respective light emitting regions include a Vs-direction component and an Hm-direction component orthogonal to the Vs-direction component. If magnitudes of the Vs-direction component and the Hm-direction component are Vs and Hm (Vs≧Hm), respectively, a ratio of Vs to Hm represented by Rp (dB)=20·log (Vs/Hm) preferably satisfies the following condition in the entire light emitting regions.

11≧Rp≧17

Hereinafter, it is assumed that the Vs-direction component and the Hm-direction component are linearly polarized light components. The Vs-direction component can be set as a polarized light component in a direction parallel to the sub-scanning direction, and the Hm-direction component can be set as a polarized light component in a direction parallel to the main scanning direction. The Vs direction and the Hm direction are orthogonal to each other.

The optical scanning apparatus needs to keep a good shading characteristic, which indicates the light utilization efficiency, so as to reduce the image quality degradations. In addition, the optical scanning apparatus is required to keep a difference between a maximum light amount and a minimum light amount to fall within 15%. However, if the difference is to be set closer to 0%, this, in turn, unavoidably increases the number of components, increases a unit price of the optical element, and deteriorates yield. Thus, this disadvantageously increases a manufacturing cost. For these reasons, the shading characteristic is preferably about 10%, with a maximum of 14 to 15% allowable. If the beams differ in polarization, transmittance and reflectance differ among the beams. If so, the image quality is degraded not only by an undesirable shading characteristic but also by a fluctuation in polarization among the respective beams.

It is physically impossible to make a polarization direction completely a single direction (Vs/Hm ratio, i.e., Rp=∞) according to the technique for manufacturing the optical elements. To increase the Rp causes a deterioration in yield of the elements and subsequently increases the manufacturing cost. Preferably, therefore, an upper limit of the Rp is set to 17, i.e., Rp≦17.

Figure 4:
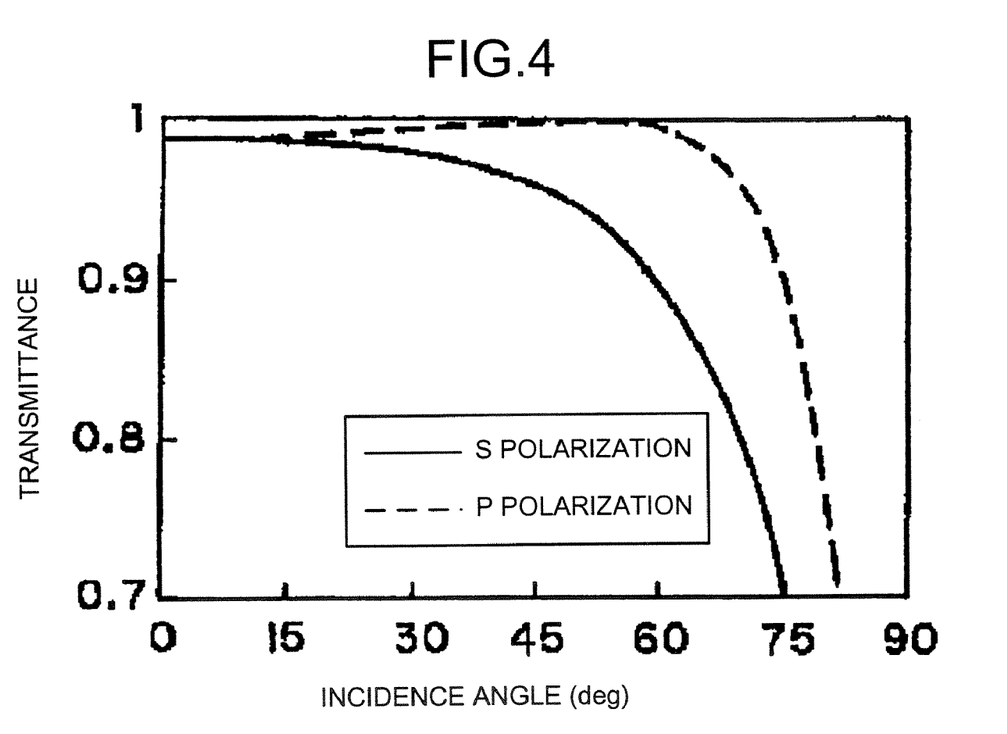
FIG. 4 is a graph of polarization dependency of a transmittance of an optical element.

In addition, a lower limit of the Rp can be set. FIG. 4 is a graph of polarization dependency of the transmittance. In FIG. 4, the horizontal axis represents an incidence angle (degrees) and the vertical axis represents the transmittance. In FIG. 4, a curve indicated by a solid line shows the polarization dependency of the transmittance for S polarization, and a curve indicated by a broken line shows that for P polarization. If a laser beam is incident on the optical element at an incidence angle equal to or greater than 45 degrees (which corresponds to a peripheral image height), the transmittance is 0.99 for the P polarization and 0.96 for the S polarization. If two optical elements having these characteristics are employed, a light amount of a P polarized light is 0.98 and that of an S polarized light is 0.92. It is assumed herein that the P polarized light is the Hm-direction component and that the S polarized light is the Vs-direction component. If the Rp is set to 17, a polarization ratio of the P polarization to the S polarization is 88% to 12%. If the Rp is set to the lower limit of 11, the polarization ratio is 76% to 24%. At Rp=10, the light amount is 0.76×0.96^2+0.24×0.99^2=0.9357. At Rp=17, the light amount is 0.88×0.96^2+0.12×0.99^2=0.9288. As can be seen, a difference of 0.74% is generated. The minimum light amount in the scanning optical system having standard shading characteristic of 14.5% is 1−14.5%=0.855, with the maximum light amount set to 1. If the difference of 0.73% is applied to the minimum light amount, the minimum light amount is as follows.

0.855×(1−0.0074)=0.849

As a result, the shading characteristic is 15.1%. With this shading characteristic, the image quality degradations are not allowable. It is, therefore, understood that the difference in polarization ratio among the respective light emitting elements of the VCSEL deteriorates the shading characteristic.

At Rp=11, the polarization ratio is 78% to 22%. The light amount is similarly calculated as follows.

0.78×0.96^2+0.22×0.99^2=0.9345

Since the difference between the minimum light amount and the maximum light amount is 0.61% and the upper limit of the Rp is 17, the light amount difference in the similar scanning optical system is 15.0%. The shading characteristic is 15.0%, which does not deteriorate the image quality. Accordingly, by setting the polarization ratio Rp of the beams emitted from the respective light emitting elements included in the VCSEL to 11≦Rp≦17, it is possible to manufacture the elements at high yield and reduce a cost of the light source. In addition, it is possible to keep a good shading characteristic and to realize the optical scanning apparatus that can form a high quality image.

Furthermore, the optical scanning apparatus can be configured to include the VCSEL that serves as the light source of the laser beams at a wavelength equal to or smaller than 500 nanometers. As such a light source, a light source (a wavelength of 405 nanometers) consisting of, for example, gallium nitride can be normally used. By making the wavelength of the laser beam from the light source shorter, it is possible to increase a focal depth, improve stability against an environmental change, reduce the beam spot diameter, and ensure excellent optical scanning.

An image forming apparatus can be constituted using this optical scanning apparatus. In the image forming apparatus including units that execute electrophotographic processes that include a charge process, an exposure process, a developing process, a transfer process, a fixing process, and a cleaning process, respectively, the optical scanning apparatus is used as the unit that executes the exposure process. According to this image forming apparatus, a manufacturing cost can be suppressed low, and it is possible to prevent image quality degradations even if a change in an environmental condition, a manufacturing error or the like occurs. In addition, it is possible to reduce the irregularity among the beam spot diameters due to the irregularity among the divergence angles of the laser beams in the VCSEL, and reduce out of color registration resulting from the irregularity. Therefore, the image forming apparatus can form a high quality image.

Figure 5:
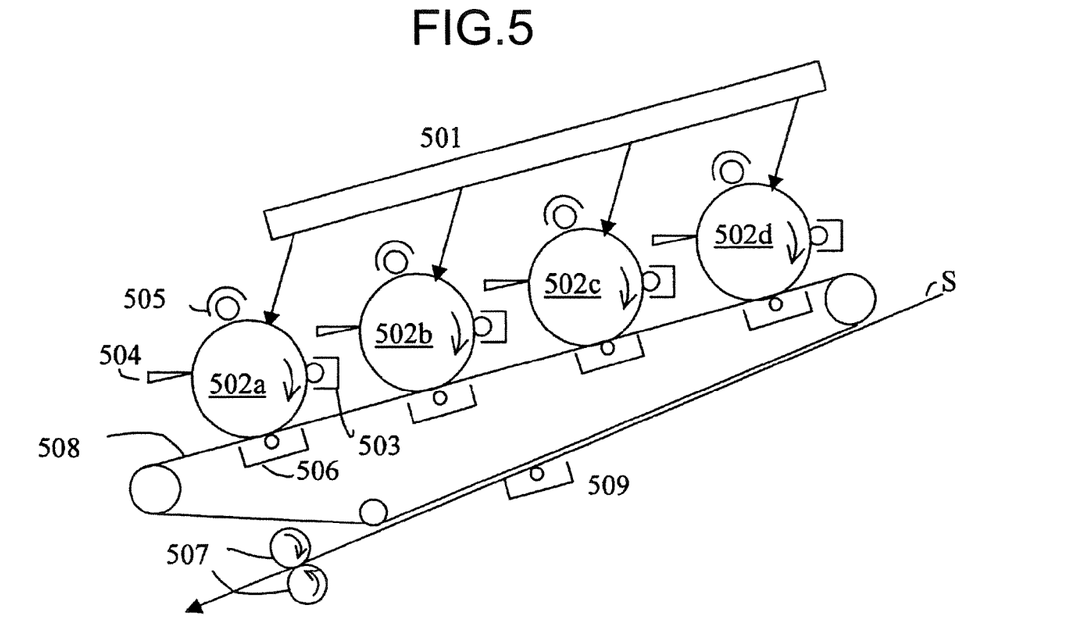
FIG. 5 is a schematic front view of an embodiment of an image forming apparatus according to the present invention.

FIG. 5 depicts the image forming apparatus according to an embodiment of the present invention. In this embodiment, the image forming apparatus is a tandem color image forming apparatus. Namely, a plurality of images are visualized by scanning and exposing a plurality of scan target surfaces relative to a plurality of laser light fluxes corresponding to the respective scan target surfaces. The visualized images are registered, whereby a color image can be formed. In FIG. 5, four photoconductive drum-like photoconductors 502a to 502d are arranged in parallel, and driven to be rotated clockwise at a constant velocity. The units that respectively execute the charge process, the exposure process, the developing process, the transfer process, the fixing process, and the cleaning process are arranged around each of the photoconductors 502*a* to 502*d* in this order in a rotation direction. The respective units arranged around the left end photoconductor 502*a* will be typically explained. A charger 505, a developing unit 503, a transfer unit 506, and a cleaner 504 are arranged around the photoconductor 502*a*. A deflected scanning beam is irradiated from an optical scanning apparatus 501 onto a surface of the photoconductor 502*a* between the charger 505 and the developing unit 503. The surface of the photoconductor 502*a* is exposed to the beam, thereby forming an electrostatic latent image. As can be seen, the optical scanning apparatus 501 functions as the unit that executes the exposure process.

The surface of the photoconductor 502*a* is uniformly charged by the charger 505. Similarly to the image forming apparatus explained above, the optical scanning apparatus 501 scans the surface of the photoconductor 502*a* relative to the beams to thereby expose the surface thereof. By performing the exposure process, the electrostatic latent image drawn on the surface of the photoconductor 502*a* is visualized as toner images, and the toner images are transferred onto an intermediate transfer belt 508 by the transfer unit 506. The surface of the photoconductor 502*a* after the transfer is cleaned and charge-neutralized by the cleaner 504, thereby eliminating residual toners. This image forming process is performed similarly on the other photoconductors 502*b* to 502*d*. The toner images visualized on the respective photoconductors 502*a* to 502*d* are sequentially registered and transferred onto the intermediate transfer belt 508, thereby forming a full-color toner image. This full-color toner image is transferred onto a sheet-like recording medium S transported along the intermediate transfer belt 508 by the other transfer unit 509. The sheet-like recording medium S is transported to the fixing unit 507, and the full-color toner image is fixed on the medium S by the fixing unit 507. The image forming process is thereby completed and the resultant medium S is discharged to the outside of the image forming apparatus. Toners that cannot be transferred onto the intermediate transfer belt 508 and remaining on surfaces of the respective photoconductors 502*a* to 502*d* as well as paper particles remaining on the surfaces thereof are eliminated by the cleaner 504. Thereafter, the surfaces of the photoconductors 502*a* to 502*d* are charged again by the charger 505.

According to the present invention, the optical scanning apparatus using the VCSEL can reduce the image quality degradations due to the irregularity among the divergence angles of the light emitting elements of the VCSEL.

According to the present invention, it is possible to provide the optical scanning apparatus that can perform a stable optical scanning even if an environment is changed, and that is less influenced by a manufacturing error and the like.

According to the present invention, the optical scanning apparatus using the VCSEL can keep a good shading characteristic relative to an irregularity among beam polarization ratios of the beams emitted from the respective light emitting elements of the VCSEL, can perform a favorable optical scanning, and can be manufactured at a low cost.

According to the present invention, it is possible to provide the optical scanning apparatus that ensures stability and high definition against an environmental change.

According to the present invention, it is possible to provide the image forming apparatus that is less influenced by an environment and a manufacturing error, that ensures stability against an irregularity among divergence angles of the respective light emitting elements of the VCSEL, and that can form a high quality image from which nonuniformity of density resulting from shading is reduced.

According to the present invention, it is possible to provide the full-color image forming apparatus that is less influenced by an environment and a manufacturing error, that ensures stability against an irregularity among divergence angles of the respective light emitting elements of the VCSEL, and that can form a high quality image from which nonuniformity of density resulting from shading is reduced at high speed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus, comprising:
    a light source that emits a plurality of light fluxes;
    a coupling optical system that couples the light fluxes to an optical system subsequent to the coupling optical system;
    an optical deflector that deflects the light fluxes in a main scanning direction; and
    a scanning optical system that is the optical system subsequent to the coupling optical system and images the light fluxes deflected by the optical deflector on a scan target surface, wherein
    the light source is a surface emitting laser provided with a plurality of apertures that limit a plurality of light emitting regions arranged in a two-dimensional array,
    the apertures are arranged to correspond to the respective light emitting regions in a one-to-one correspondence, and
    the scanning optical system satisfies conditions of $$Dm \cdot |\beta m| < \omega m \text{ and } Ds \cdot |\beta s| < \omega s$$

where Dm denotes a width of each of the apertures in the main scanning direction, Ds denotes a width of each aperture in the sub-scanning direction, βm denotes a magnification of both the coupling optical system and the scanning optical system in the main scanning direction, βs denotes a magnification of both the coupling optical system and the scanning optical system in the sub-scanning direction, ωm denotes the size of an optical spot in the main scanning direction formed on the scan target surface, and ωs denotes the size of the optical spot in the sub-scanning direction formed on the scan target surface.

2. The optical scanning apparatus according to claim 1, wherein the scanning optical system satisfies the condition of:

$$0.4 < (Ds \cdot |\beta s|/\omega s)/(Dm \cdot |\beta m|/\omega m) < 1.$$

3. The optical scanning apparatus according to claim 1, further comprising a shielding member provided between the light source and the scanning optical system.

4. The optical scanning apparatus according to claim 1, wherein
    if polarized light beams emitted from the light emitting regions of the surface emitting laser include a Vs-direction component and an Hm-direction component orthogonal to the Vs-direction component, and magnitudes of the Vs-direction component and the Hm-direction components are Vs and Hm, respectively, where Vs≧Hm, then the ratio of Vs to Hm that is represented by Rp (dB)=20·log(Vs/Hm) satisfies the condition of $11 \leq Rp \leq 17$ in all of the light emitting regions.

5. The optical scanning apparatus according to claim 4, wherein
the Vs-direction component is set as a polarized light component in a direction parallel to the sub-scanning direction, and the Hm-direction component is set as a polarized light component in a direction parallel to the main scanning direction.

6. The optical scanning apparatus according to claim 1, wherein
the light source emits the light fluxes each at a wavelength equal to or smaller than 500 nanometers.

7. An image forming apparatus comprising a plurality of units that execute electrophotographic processes, the image forming apparatus further including:
an optical scanning apparatus as a unit that executes an exposure process included in the electrophotographic processes,
wherein the optical scanning apparatus includes:
a light source that emits a plurality of light fluxes;
a coupling optical system that couples the light fluxes to an optical system subsequent to the coupling optical system;
an optical deflector that deflects the light fluxes in a main scanning direction; and
a scanning optical system that is the optical system subsequent to the coupling optical system and images the light fluxes deflected by the optical deflector on a scan target surface, wherein
the light source is a surface emitting laser provided with a plurality of apertures that limit a plurality of light emitting regions arranged in a two-dimensional array,
the apertures are arranged to correspond to the respective light emitting regions in a one-to-one correspondence, and
the scanning optical system satisfies conditions of $$Dm \cdot |\beta m| < \omega m \text{ and } Ds \cdot |\beta| < \omega s$$

where Dm denotes a width of each of the apertures in the main scanning direction, Ds denotes a width of each aperture in the sub-scanning direction, βm denotes a magnification of both the coupling optical system and the scanning optical system in the main scanning direction, βs denotes a magnification of both the coupling optical system and the scanning optical system in the sub-scanning direction, ωm denotes the size of an optical spot in the main scanning direction formed on the scan target surface, and ωs denotes the size of the optical spot in the sub-scanning direction formed on the scan target surface.

8. A tandem color image forming apparatus that comprises a plurality of image forming apparatuses each including units that execute electrophotographic processes, respectively, the respective image forming apparatuses forming images corresponding to a plurality of colors, and forming a color image by registering the images formed by the respective image forming apparatuses, each of the image forming apparatuses being provided with an optical scanning apparatus as a unit that executes an exposure process included in the electrophotographic processes,
wherein the optical scanning apparatus further includes:
a light source that emits a plurality of light fluxes;
a coupling optical system that couples the light fluxes to an optical system subsequent to the coupling optical system;
an optical deflector that deflects the light fluxes in a main scanning direction; and
a scanning optical system that is the optical system subsequent to the coupling optical system and images the light fluxes deflected by the optical deflector on a scan target surface, wherein
the light source is a surface emitting laser provided with a plurality of apertures that limit a plurality of light emitting regions arranged in a two-dimensional array,
the apertures are arranged to correspond to the respective light emitting regions in a one-to-one correspondence, and
the scanning optical system satisfies conditions of $$Dm \cdot |\beta m| < \omega m \text{ and } Ds \cdot |\beta s| < \omega s$$

where Dm denotes a width of each of the apertures in the main scanning direction, Ds denotes a width of each aperture in the sub-scanning direction, βm denotes a magnification of both the coupling optical system and the scanning optical system in the main scanning direction, βs denotes a magnification of both the coupling optical system and the scanning optical system in the sub-scanning direction, ωm denotes the size of an optical spot in the main scanning direction formed on the scan target surface, and ωs denotes the size of the optical spot in the sub-scanning direction formed on the scan target surface.

\* \* \* \* \*